(12) United States Patent
Goldman et al.

(10) Patent No.: US 12,216,617 B2
(45) Date of Patent: Feb. 4, 2025

(54) MUSIC AND DIGITAL RIGHTS MANAGEMENT SYSTEMS AND METHODS

(71) Applicant: Muserk, LLC, New York, NY (US)

(72) Inventors: Paul David Goldman, New York, NY (US); Collin Robert White, Mount Juliet, TN (US); Quentin Nicholas Bradley, Nashville, TN (US); Justin David Ahmanson, Fort Collins, CO (US)

(73) Assignee: Muserk, LLC, New York, NY (US)

( * ) Notice: Subject to any disclaimer, the term of this patent is extended or adjusted under 35 U.S.C. 154(b) by 154 days.

(21) Appl. No.: 18/117,575

(22) Filed: Mar. 6, 2023

(65) Prior Publication Data

US 2023/0237129 A1     Jul. 27, 2023

Related U.S. Application Data

(63) Continuation-in-part of application No. 16/799,201, filed on Feb. 24, 2020, now Pat. No. 11,599,502.
(Continued)

(51) Int. Cl.
*G06F 16/65* (2019.01)
*G06F 16/11* (2019.01)
(Continued)

(52) U.S. Cl.
CPC .......... *G06F 16/148* (2019.01); *G06F 16/116* (2019.01); *G06F 16/65* (2019.01); *G06F 21/12* (2013.01); *G06F 21/1012* (2023.08)

(58) Field of Classification Search
CPC ...... G06F 21/16; G06F 16/148; G06F 16/116; G06F 16/1748
(Continued)

(56) References Cited

U.S. PATENT DOCUMENTS 9,122,394 B2 *   9/2015   Funabashi ........... G06F 3/04886
9,747,368 B1 *   8/2017   Heitz, III ............ G06F 16/1748
(Continued)

OTHER PUBLICATIONS

Written Opinion of the International Searching Authority in PCT/US2024/018529 (Jun. 7, 2024).
International Search Report in PCT/US2024/018529 (Jun. 7, 2024).

*Primary Examiner* — Shahid A Alam
(74) *Attorney, Agent, or Firm* — Pryor Cashman LLP

(57) ABSTRACT

A method and associated system for matching and delivering digital work metadata to one or more digital service providers including modifying one or more digital work metadata files, which includes removing non-critical data or segment-erroneous data or performing a language translation; reformatting the one or more digital work metadata files for compatibility with a transformer model-based AI matching operation; performing a block grouping operation on the one or more digital work metadata files, where data associated with the one or more digital work metadata files is grouped in blocks and analyzed for one or more pairs of data records; performing the transformer model-based AI matching operation to determine whether each pair of the one or more pairs of data records comprise a matching pair of data records; and transmitting output data from the transformer model-based artificial intelligence matching operation to the one or more digital service providers.

16 Claims, 5 Drawing Sheets

Related U.S. Application Data

(60) Provisional application No. 62/809,590, filed on Feb. 23, 2019.

(51) Int. Cl.
 *G06F 16/14* (2019.01)
 *G06F 21/12* (2013.01)
 *G06F 21/10* (2013.01)

(58) Field of Classification Search
 USPC .................................. 707/704, 804; 726/26
 See application file for complete search history.

(56) References Cited

U.S. PATENT DOCUMENTS

| | | | |
|---|---|---|---|
| 9,928,248 B2* | 3/2018 | Akirav | G06F 16/1748 |
| 10,474,640 B1* | 11/2019 | Roche, Jr. | G06F 16/14 |
| 11,599,502 B2* | 3/2023 | Goldman | G06F 16/148 |
| 2007/0255965 A1* | 11/2007 | McGucken | G06Q 30/08 |
| | | | 713/193 |
| 2011/0015968 A1* | 1/2011 | Carlson | G06Q 50/184 |
| | | | 705/40 |
| 2013/0262394 A1* | 10/2013 | Kumarasamy | G06F 16/2264 |
| | | | 707/673 |
| 2014/0053212 A1* | 2/2014 | Shoykher | H04N 21/43072 |
| | | | 725/59 |
| 2015/0016661 A1* | 1/2015 | Lord | H04N 21/42203 |
| | | | 382/100 |
| 2018/0181730 A1* | 6/2018 | Lyske | G06F 21/16 |
| 2019/0272834 A1* | 9/2019 | Brenner | G10L 19/018 |
| 2020/0320179 A1 | 10/2020 | Goldman et al. | |
| 2022/0108698 A1* | 4/2022 | Moritz | G05B 23/024 |

\* cited by examiner

MUSIC AND DIGITAL RIGHTS MANAGEMENT SYSTEMS AND METHODS

CROSS-REFERENCE TO RELATED APPLICATIONS

The present application is a continuation-in-part of U.S. Non-Provisional patent application Ser. No. 16/799,201, filed Feb. 24, 2020, which claims priority to U.S. Provisional Patent Application No. 62/809,590, filed Feb. 23, 2019, the disclosures and teachings of which are incorporated herein by reference.

TECHNICAL FIELD

The present invention relates to systems and methods of music and digital rights management. More specifically, the present invention relates to systems and methods of transforming, matching, and delivering music and digital works metadata to digital service providers' (DSPs') associated sound recording usage data.

BACKGROUND OF THE INVENTION

Given the sprawling nature of today's Internet, it is a difficult task for music rights holders to positively identify and obtain all royalties owed to the holder. Accordingly, there is a need for a system and associated method that assists music rights holders and other digital rights holders to seek out and obtain owed royalties.

SUMMARY OF THE INVENTION

In general, in one aspect, the invention features a method for matching and delivering digital work metadata to one or more digital service providers including, under control of one or more processors configured with executable instructions, modifying one or more digital work metadata files, where the modifying one or more digital work metadata files includes removing non-critical data or segment-erroneous data or performing a language translation; reformatting the one or more digital work metadata files for compatibility with a transformer model-based artificial intelligence matching operation; performing a block grouping operation on the one or more digital work metadata files, where data associated with the one or more digital work metadata files is grouped in blocks and analyzed for one or more pairs of data records; performing the transformer model-based artificial intelligence matching operation on the one or more pairs of data records to determine whether each pair of the one or more pairs of data records comprise a matching pair of data records; and transmitting output data from the transformer model-based artificial intelligence matching operation to the one or more digital service providers.

Implementations of the invention may include one or more of the following features. The one or more digital work metadata files may be sound recording metadata files. The transformer model-based artificial intelligence matching operation may include matching one or more underlying criteria, the one or more underlying criteria including composition title, composition writer, sound recording title, or sound recording artist. The output data may be transmitted to the one or more digital service providers via one or more third party application programming interfaces.

The method may further include transmitting the output data to a rights administration dashboard prior to transmission to the one or more digital service providers. The method may further include converting the output data into a data standard format compatible with each of the one or more digital service providers prior to transmission to the one or more digital service providers. The method may further include performing a second artificial intelligence matching operation on the one or more pairs of data records, the second artificial intelligence matching operation based on a Dedupe Python library. The transformer model-based artificial intelligence matching operation may be performed on a cloud infrastructure.

In general, in another aspect, the invention features a system configured to match and deliver digital work metadata to one or more digital service providers, including one or more processors, one or more non-transitory computer-readable media, and one or more modules maintained on the one or more non-transitory computer-readable media that, when executed by the one or more processors, cause the one or more processors to perform operations including: modifying one or more digital work metadata files, where the modifying one or more digital work metadata files includes removing non-critical data or segment-erroneous data or performing a language translation; reformatting the one or more digital work metadata files for compatibility with a transformer model-based artificial intelligence matching operation; performing a block grouping operation on the one or more digital work metadata files, where data associated with the one or more digital work metadata files is grouped in blocks and analyzed for one or more pairs of data records; performing the transformer model-based artificial intelligence matching operation on the one or more pairs of data records to determine whether each pair of the one or more pairs of data records comprise a matching pair of data records; and transmitting output data from the transformer model-based artificial intelligence matching operation to the one or more digital service providers.

Implementations of the invention may include one or more of the following features. The one or more digital work metadata files may be sound recording metadata files. The transformer model-based artificial intelligence matching operation may include matching one or more underlying criteria, the one or more underlying criteria including composition title, composition writer, sound recording title, or sound recording artist. The output data may be transmitted to the one or more digital service providers via one or more third party application programming interfaces.

The system may further include an additional operation of transmitting the output data to a rights administration dashboard prior to transmission to the one or more digital service providers. The system may further include an additional operation of converting the output data into a data standard format compatible with each of the one or more digital service providers prior to transmission to the one or more digital service providers. The system may further include an additional operation of performing a second artificial intelligence matching operation on the one or more pairs of data records, the second artificial intelligence matching operation based on a Dedupe Python library. The transformer model-based artificial intelligence matching operation may be performed on a cloud infrastructure.

DETAILED DESCRIPTION OF THE INVENTION

Figure 1:
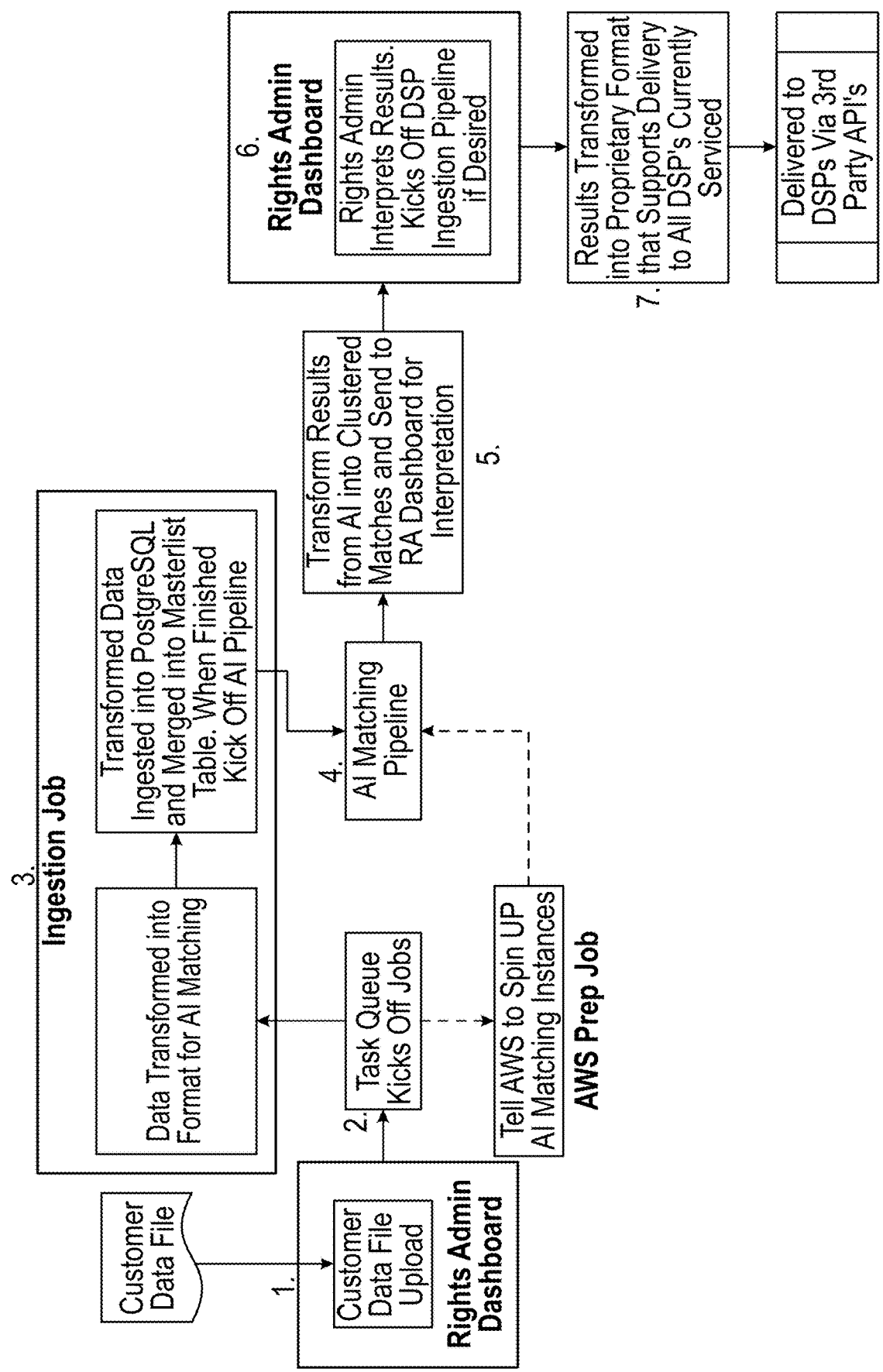
FIG. 1 illustrates an operational flowchart of a system and associated method of one embodiment of the present invention.

The present invention is directed to a system and associated method for transforming, matching, and delivering music and digital works metadata to DSPs' associated sound recording usage data. The matching mechanism may include a customer data transformation aspect followed by transmission to an artificial intelligence (AI) entity resolution library. This library may be configured for Python and may be based on an open source library, such as Dedupe. The system may include a pre-matching analysis mechanism configured to extract positive matches from one or more datasets, such as 1:1 correlations of International Standard Work Codes (ISWCs), International Standard Recording Codes (ISRCs), and other authoritative data points, and transmit unmatched data, if any, to an adapted Dedupe library. After AI processing of the data, the system may extract the results into a specific data standard or file format utilized to deliver ownership information to available DSPs in accordance with DSP submission requirements. The system may take the form of an automated software pipeline.

The system of the present invention may include several aspects. A first aspect is a pre-analysis transformation. The system may process a metadata file, such as one provided by a customer, to remove any superfluous data and/or segment any erroneous or potentially erroneous data. The system may then reformat the file for, e.g., merging capabilities with DSP Usage Reports into a database table.

A second aspect is a pre-analysis matching. The system may utilize the metadata file in performing a matching analysis with the DSP Usage Report table. The matching may be performed on the basis of one or more data points, including ISWCs, ISRCs, and other authoritative data points. The resulting dataset may be parsed for determination of additional authoritative data points. In a non-limiting example, new ISWCs may be discovered where only ISRCs had been available in a metadata file, and new ISRCs may be discovered where only ISWCs had been available in a metadata file. Newly discovered authoritative data points may be further matched, with results being added to, e.g., a table of compositions and linked sound recordings. In one example of such a table, the table may represent data clusters that are updated through AI matching. Compositions and sound recordings that do not form part of a data cluster may be subjected to AI processing for predictive matching.

A third aspect is the aforementioned AI matching, particularly via an adapted Dedupe library. The adapted Dedupe library may be capable of performing clustering and entity resolution on large datasets, such as over 25 million rows, at scale. The AI matching mechanism may be executed on an entire dataset, including with a training predicate set that supports matching on one or more underlying criteria, e.g., Composition Title & Writers and Sound Recording Title & Artist. This Dedupe library may be configured with one or more statistical analysis-based matching techniques as well as with the training predicate set to produce a confidence score for a clustered match. A generated result may include a table having one or more of cluster identifications, confidence scores, and additional data points appended to the original database table. Clusters may be merged with those clusters created during the pre-analysis matching aspect, resulting in affinities of sound recordings linked to a single work. Such affinities may be updated as, e.g., new works data and DSP Usage Reports are processed by a system of the present invention.

A fourth aspect is be a post-analysis transformation configured to transmit matching files to a rights administration dashboard. Upon approval by a rights administrator, this data may be converted into a specific data standard, which may be a flat file, such as a comma separated values (CSV) file. This converted data may be ingested by an ingestion pipeline associated with the system for transforming the relevant metadata into a DSP-specific format.

FIG. 1 illustrates an operational flowchart of a system and associated method of an embodiment of the present invention. A data file ("Customer Data File") may be uploaded to a rights administration dashboard. The data file may be placed in a queue for pre-analysis transformation as well as for requesting that AMAZON WEB SERVICES (AWS) launch the AI matching mechanism, as this mechanism may be launched only on demand. The data file may be transformed and ingested into a PostgreSQL database and then merged into a DSP Usage Report table. Should the AI matching mechanism be launched, the data will be sent for commencing AI matching. Particularly, a Dedupe-based pipeline may be executed on the transformed/ingested dataset. The data file may then be transformed from a raw AI output to a readable format of predicted matches and delivered to the rights administration dashboard. Upon approval by a rights administrator, the data may be ingested by a DSP ingestion pipeline. This data is converted into a specific data standard format that supports transmission to all relevant DSPs, and subsequently transmitted to the DSPs, such as via third party application programming interfaces (APIs).

Figure 2:
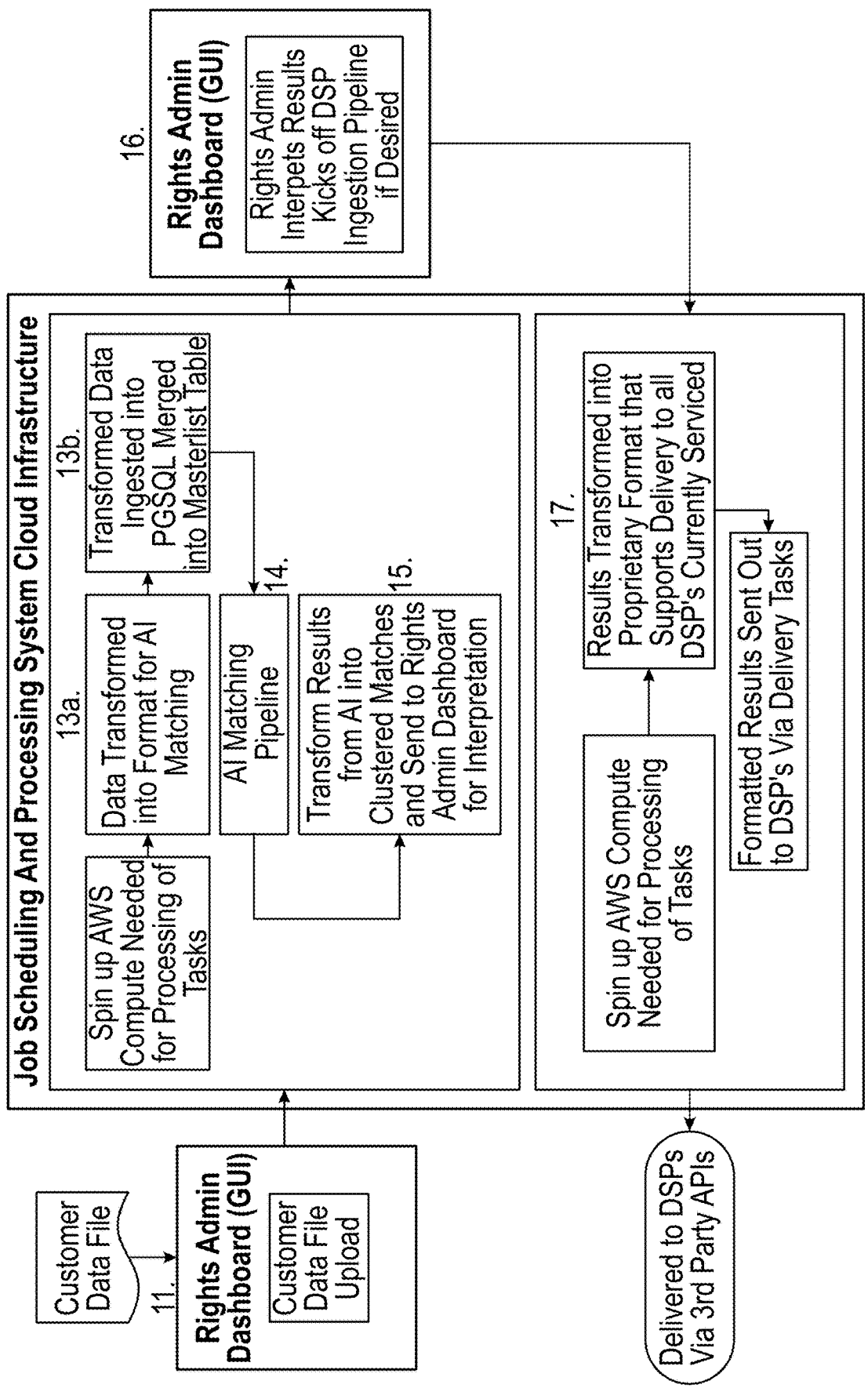
FIG. 2 illustrates an operational flowchart of a system and associated method of another embodiment of the present invention, utilizing a job scheduling and processing system.
Figure 3:
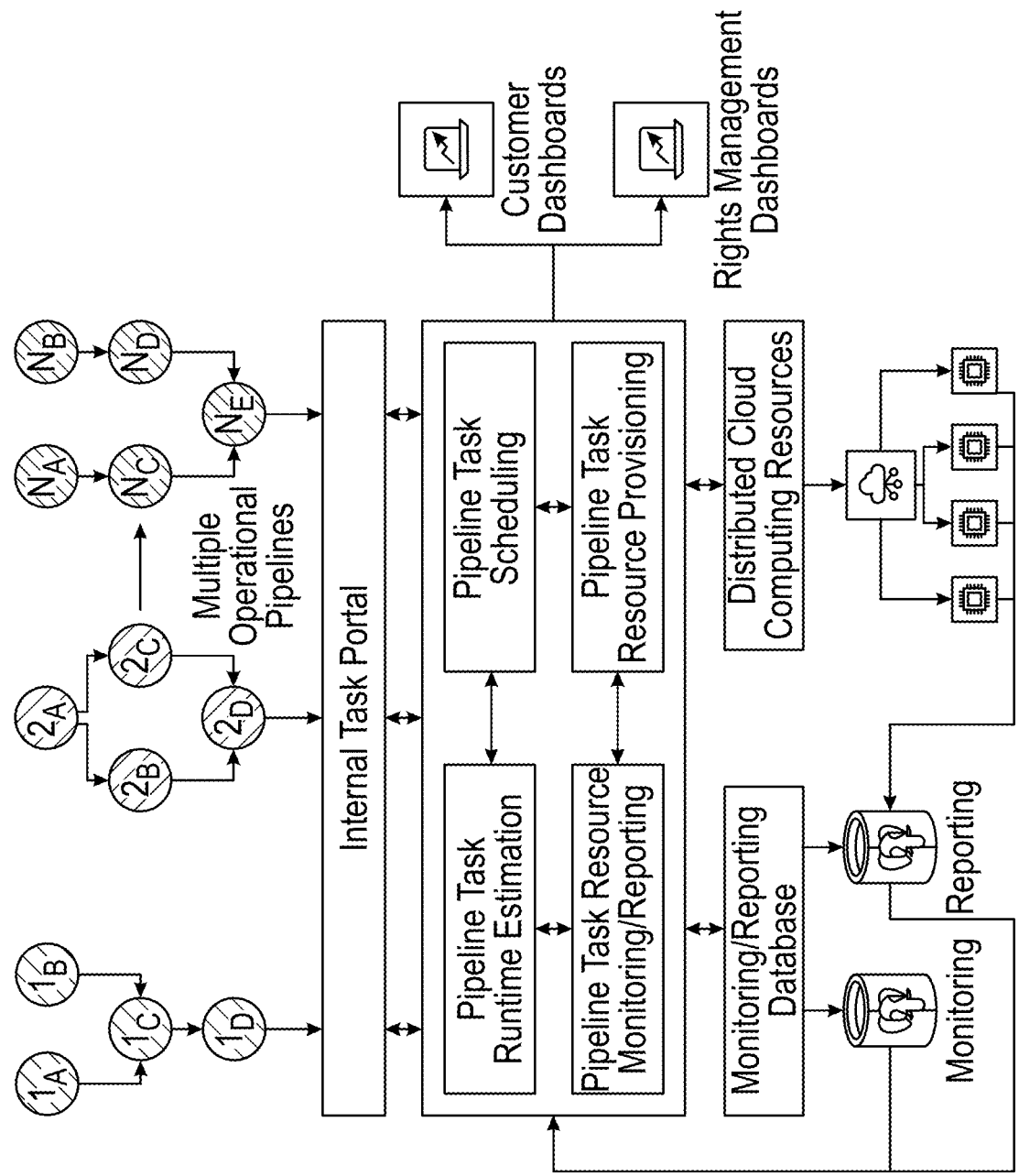
FIG. 3 illustrates an operational flowchart of a job scheduling and processing system for utilization in the present invention.

FIG. 2 illustrates an operational flowchart of a system and associated method of another embodiment of the present invention, similar to the embodiment of FIG. 1 and utilizing a job scheduling and processing system, such as but not limited to the job scheduling and processing system embodied in FIG. 3. FIG. 2 illustrates those operations that are performed in the cloud infrastructure associated with the job scheduling and processing system, including pre-analysis transformation, pre-analysis matching, AI matching, and post-analysis transformation, as well as DSP ingestion pipeline operations. Outside the cloud infrastructure is the rights administration dashboard, which may be configured as a graphical user interface (GUI).

FIG. 3 illustrates an operational flowchart of a job scheduling and processing system for utilization in the present invention. The job scheduling and processing system is configured to marshall, monitor, and report on one or more job or operational pipelines through a cloud infrastructure. Any type of computational job may be scheduled, picked up, and assigned for cloud computing by the job scheduling and processing system. The job scheduling and processing system is configured to maintain an active or available status, and is capable of scaling up the cloud infrastructure when required by, or necessary for, a requested computational job.

There are multiple job or operational pipelines depicted in FIG. 3, including those associated with data ingestion, data delivery, and content discovery, including in connection with an AI-based system. A pipeline may be composed of several computational tasks, as indicated by the subscript lettering, that result in the desired output upon completion of all relevant tasks. The job scheduling and processing system maintains awareness of the necessary computational tasks in a specific pipeline via database tables that define the tasks and associated steps required to complete the pipeline. These illustrated and described pipelines are exemplary and non-limiting.

As further illustrated in FIG. 3, aspects that may be controlled or operated by the job scheduling and processing system include ingestion of data into databases from a rights administration dashboard (e.g., triggered by an end user), transformation of data for feeding into an AI-based system, transformation and ingestion of resulting data from the AI-based system into databases, transformation of data (including rights administration interpretation of results) into a data format acceptable for delivery to all DSPs, and delivery of the data to the DSPs.

Figure 4:
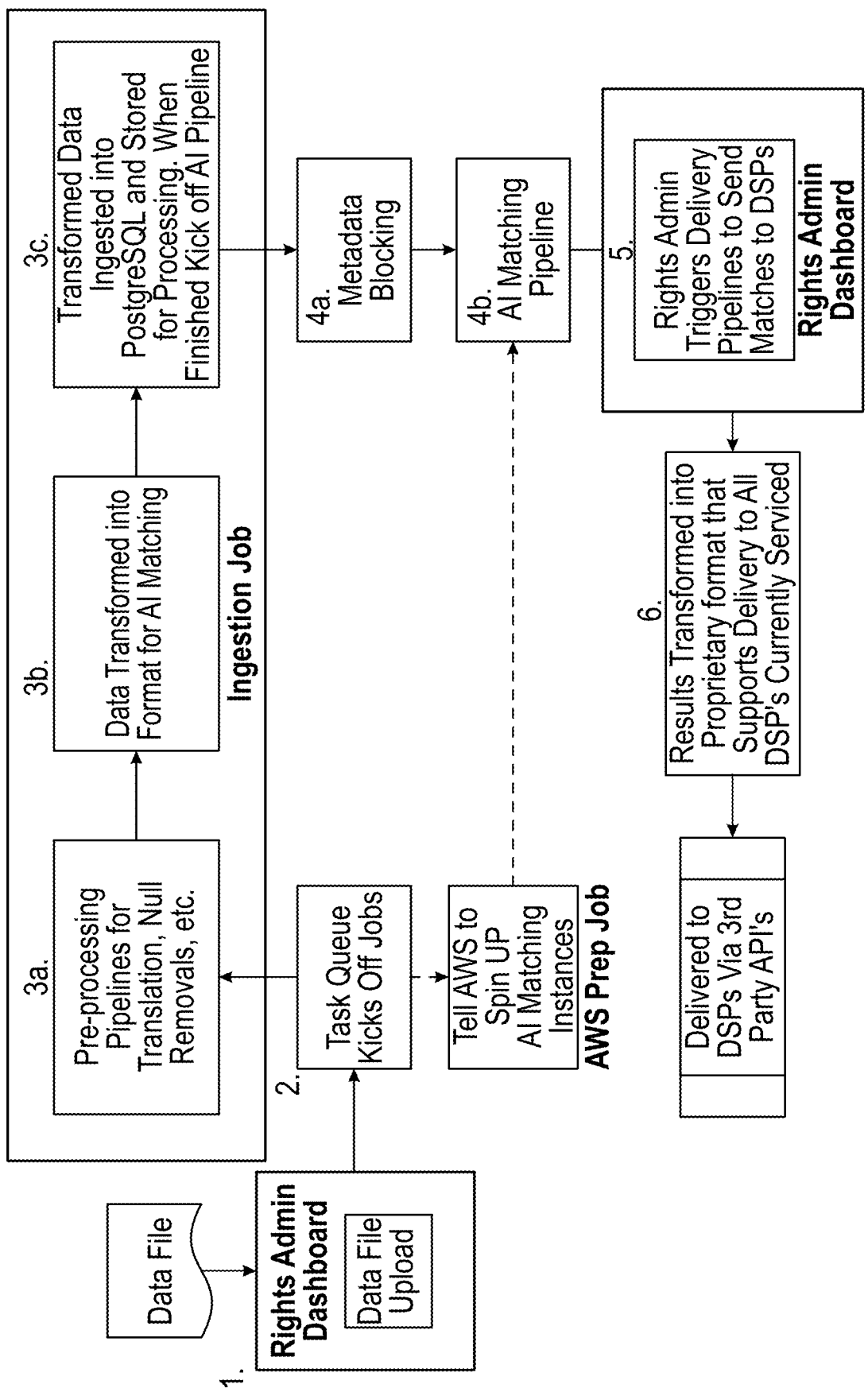
FIG. 4 illustrates a first operational flowchart of a system and associated method of another embodiment of the present invention.
Figure 5:
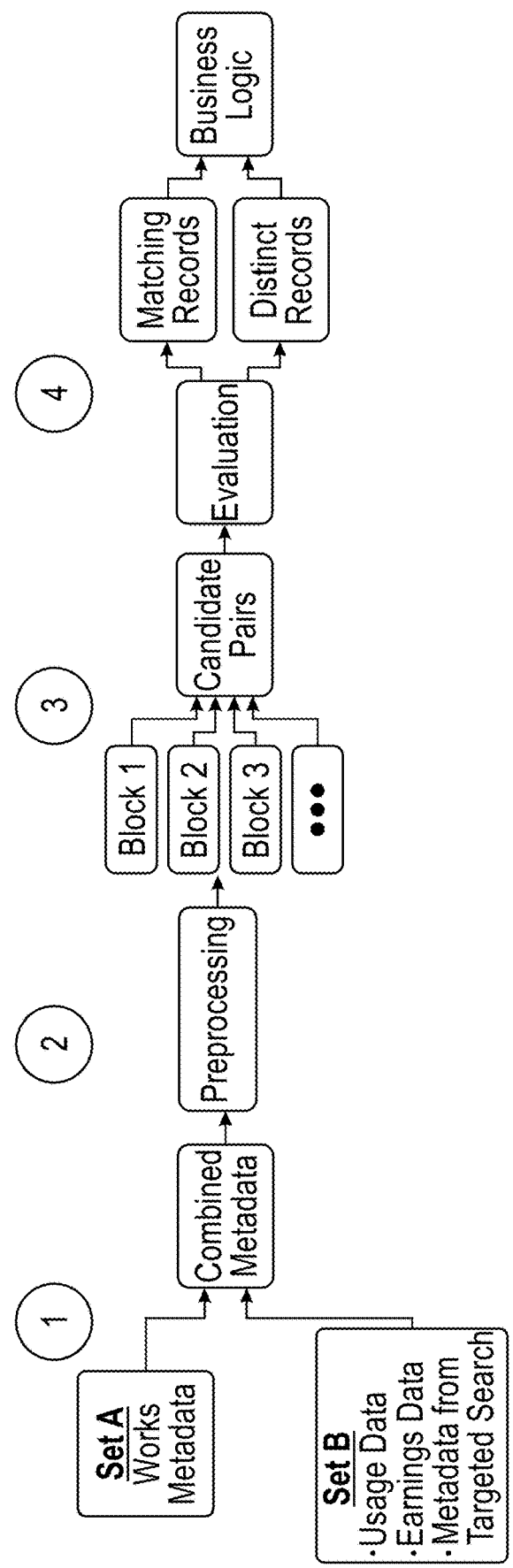
FIG. 5 illustrates a second operational flowchart of a system and associated method of the embodiment of FIG. 4.

FIGS. 4-5 illustrate operational flowcharts of a system and associated method of another embodiment of the present invention. The present embodiment differs from that of FIG. 1 in several regards. First, prior to initiation of the AI matching mechanism, the pipelined data is subjected to a blocking mechanism based on tokenization of specific metadata fields, including but not limited to composition title, composition writer/author, sound recording title, and sound recording artist. The blocked data is then subjected to a candidate pair generation algorithm that analyzes the blocks to generate groupings of candidate pairs of similar data based on defined thresholds. The candidate pairs may be stored in a readily-available storage system to enable expeditious searching by the AI mechanism of the present system, which is able to determine whether the candidate pairs are, in fact, a match (yes/no) without the need for human interpretation or involvement. The AI mechanism may be performed in coordination with the aforementioned Dedupe library, and either or both sets of results may be utilized as desired including depending on the particular task.

Another aspect of the embodiment of FIGS. 4-5 is the AI matching pipeline's use of transformer model-based AI trained specifically on digital asset metadata, e.g., musical metadata such as composition title, writer/author, sound recording title, artist, etc. Utilization of a transformer model is effective in removing the need for human interpretation of results and human involvement in decision making. For example, the model may output a decision on whether two entities are the same, with 95% confidence.

Another aspect of the embodiment of FIGS. 4-5 is the inclusion of initial pre-processing treatment in the ingestion pipeline. Prior to the AI matching aspects of the present system, various automated pre-processing pipelines may be utilized with respect to the ingested data, including but not limited to language translation, non-useful data removal or null removal, and sorting or deduplication of records.

At the conclusion of the AI matching pipeline, matched entities may be stored for future use. In particular, matched entities may be stored or represented in a database for canonicalization within the respective works or digital assets to which the matched entities are linked based on the associated source data (e.g., the data in Set A illustrated in FIG. 5). The storage of matched entities enables enhancement of the relevant data, e.g., the data in Set A illustrated in FIG. 5, in future analyses including additional metadata, which results in improved blocking and matching capabilities over time as more data passes through such systems of the present invention.

FIG. 4 provides an operational flowchart with a structure corresponding to that of FIG. 1. FIG. 5 provides an alternative operational flowchart to that of FIG. 4, highlighting four pipeline aspects, namely data combination, followed by pre-processing of the combined dataset, then blocking for candidate pair generation, and finally evaluation of the candidate pairs, such as based on use of a Dedupe library or a trained Natural Language Processing (NLP) transformer model-based AI, as described above.

The systems embodied in FIGS. 4-5 may be utilized not only in connection with discovering and delivering relevant matches to various digital service providers but also for royalty reconciliation, namely reconciling mismatched earnings data. With relevant earnings data being utilized and ingested, such as indicated in Set B illustrated in FIG. 5, systems of the present invention including modified, pre-processing pipelines are capable of facilitating matches on internal earnings data for linking earnings to copyright holders.

The embodiments and examples above are illustrative, and many variations can be introduced to them without departing from the spirit and scope of the disclosure or from the scope of the invention. For example, elements and/or features of different illustrative and exemplary embodiments herein may be combined with each other and/or substituted with each other within the scope of this disclosure. For a better understanding of the invention, its operating advantages and the specific objects attained by its uses, reference should be had to the drawings and descriptive matter, in which there is illustrated a preferred embodiment of the invention.

What is claimed is:

1. A method for matching and delivering digital work metadata to one or more digital service providers, comprising:
    under control of one or more processors configured with executable instructions,
        modifying one or more digital work metadata files, wherein the modifying one or more digital work metadata files includes removing non-critical data or segment-erroneous data or performing a language translation;
        reformatting the one or more digital work metadata files for compatibility with a transformer model-based artificial intelligence matching operation;
        performing a block grouping operation on the one or more digital work metadata files, wherein data associated with the one or more digital work metadata files is grouped in blocks and analyzed for one or more pairs of data records;
        performing the transformer model-based artificial intelligence matching operation on the one or more pairs of data records to determine whether each pair of the one or more pairs of data records comprise a matching pair of data records; and
        transmitting output data from the transformer model-based artificial intelligence matching operation to the one or more digital service providers.

2. The method of claim 1, wherein the one or more digital work metadata files are sound recording metadata files.

3. The method of claim 1, wherein the transformer model-based artificial intelligence matching operation includes matching one or more underlying criteria, the one or more underlying criteria including composition title, composition writer, sound recording title, or sound recording artist.

4. The method of claim 1, wherein the output data is transmitted to the one or more digital service providers via one or more third party application programming interfaces.

5. The method of claim 1, further comprising transmitting the output data to a rights administration dashboard prior to transmission to the one or more digital service providers.

6. The method of claim 1, further comprising converting the output data into a data standard format compatible with each of the one or more digital service providers prior to transmission to the one or more digital service providers.

7. The method of claim 1, further comprising performing a second artificial intelligence matching operation on the one or more pairs of data records, the second artificial intelligence matching operation based on a Dedupe Python library.

8. The method of claim 1, wherein the transformer model-based artificial intelligence matching operation is performed on a cloud infrastructure.

9. A system configured to match and deliver digital work metadata to one or more digital service providers, comprising:
one or more processors;
one or more non-transitory computer-readable media; and
one or more modules maintained on the one or more non-transitory computer-readable media that, when executed by the one or more processors, cause the one or more processors to perform operations including:
modifying one or more digital work metadata files, wherein the modifying one or more digital work metadata files includes removing non-critical data or segment-erroneous data or performing a language translation;
reformatting the one or more digital work metadata files for compatibility with a transformer model-based artificial intelligence matching operation;
performing a block grouping operation on the one or more digital work metadata files, wherein data associated with the one or more digital work metadata files is grouped in blocks and analyzed for one or more pairs of data records;
performing the transformer model-based artificial intelligence matching operation on the one or more pairs of data records to determine whether each pair of the one or more pairs of data records comprise a matching pair of data records; and
transmitting output data from the transformer model-based artificial intelligence matching operation to the one or more digital service providers.

10. The system of claim 9, wherein the one or more digital work metadata files are sound recording metadata files.

11. The system of claim 9, wherein the transformer model-based artificial intelligence matching operation includes matching one or more underlying criteria, the one or more underlying criteria including composition title, composition writer, sound recording title, or sound recording artist.

12. The system of claim 9, wherein the output data is transmitted to the one or more digital service providers via one or more third party application programming interfaces.

13. The system of claim 9, further comprising an additional operation of transmitting the output data to a rights administration dashboard prior to transmission to the one or more digital service providers.

14. The system of claim 9, further comprising an additional operation of converting the output data into a data standard format compatible with each of the one or more digital service providers prior to transmission to the one or more digital service providers.

15. The system of claim 9, further comprising an additional operation of performing a second artificial intelligence matching operation on the one or more pairs of data records, the second artificial intelligence matching operation based on a Dedupe Python library.

16. The system of claim 9, wherein the transformer model-based artificial intelligence matching operation is performed on a cloud infrastructure.

* * * * *